United States Patent
Tsuchida et al.

(10) Patent No.: US 9,452,759 B2
(45) Date of Patent: Sep. 27, 2016

(54) VEHICLE-USE COLLISION MITIGATION APPARATUS

(71) Applicants: DENSO CORPORATION, Kariya, Aichi-pref. (JP); Toyota Jidosha Kabushiki Kaisha, Toyota-shi, Aichi-ken (JP)

(72) Inventors: Norio Tsuchida, Kariya (JP); Jun Tsuchida, Toyota (JP); Masayuki Shimizu, Toyota (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/258,310

(22) Filed: Apr. 22, 2014

(65) Prior Publication Data

US 2014/0324286 A1    Oct. 30, 2014

(30) Foreign Application Priority Data

Apr. 26, 2013   (JP) .................. 2013-093822

(51) Int. Cl.
| | |
|---|---|
| *B60W 50/00* | (2006.01) |
| *G08G 1/0967* | (2006.01) |
| *G08G 1/16* | (2006.01) |
| *B60T 7/22* | (2006.01) |
| *B60W 30/09* | (2012.01) |
| *B60W 30/095* | (2012.01) |
| *B60W 30/085* | (2012.01) |

(52) U.S. Cl.
CPC ............... *B60W 50/00* (2013.01); *B60T 7/22* (2013.01); *B60W 30/09* (2013.01); *B60W 30/095* (2013.01);
(Continued)

(58) Field of Classification Search
CPC .. B60W 50/00; B60W 30/09; B60W 30/095; B60W 30/085; G08G 1/096716; G08G 1/096758; G08G 1/167; G08G 1/166; G08G 1/164; G08G 1/096783; B60T 7/22
USPC ........ 701/36, 300–302, 70, 79; 340/435–437
See application file for complete search history.

(56) References Cited

U.S. PATENT DOCUMENTS

| | | | |
|---|---|---|---|
| 8,362,922 B2 * | 1/2013 | Kushi | ............. G08G 1/096716 340/436 |
| 8,838,372 B2 | 9/2014 | Noda | |

(Continued)

FOREIGN PATENT DOCUMENTS

| | | |
|---|---|---|
| DE | 102004046360 A1 | 3/2006 |
| DE | 102004056118 A1 | 5/2006 |

(Continued)

OTHER PUBLICATIONS

Office Action dated Mar. 10, 2015 in corresponding Japanese Application No. 2013-093822.

(Continued)

*Primary Examiner* — Nga X Nguyen
(74) *Attorney, Agent, or Firm* — Harness, Dickey & Pierce, P.L.C.

(57) ABSTRACT

A collision mitigation apparatus for mitigating damage to a vehicle at a time of collision, on which the collision mitigation apparatus is mounted, includes an operation control unit that detects a collision object present around the vehicle, makes a comparison between a collision time indicative of a time remaining before collision between the vehicle and the collision object and an operation reference time according to which timing to start control for avoiding collision is set, and causes a collision mitigation device mounted on the vehicle to start operating depending on a result of the comparison. The collision mitigation apparatus further includes a collision probability calculating unit that calculates a collision probability between the vehicle and the collision object, and a reference time setting unit that sets the operation reference time depending on the collision probability.

5 Claims, 6 Drawing Sheets

(52) U.S. Cl.
CPC .. *G08G 1/096716* (2013.01); *G08G 1/096758* (2013.01); *G08G 1/096783* (2013.01); *G08G 1/164* (2013.01); *G08G 1/166* (2013.01); *G08G 1/167* (2013.01); *B60W 30/085* (2013.01)

(56) References Cited

U.S. PATENT DOCUMENTS

| | | | | |
|---|---|---|---|---|
| 2008/0097699 | A1* | 4/2008 | Ono | 701/300 |
| 2009/0299576 | A1 | 12/2009 | Baumann et al. | |
| 2011/0125372 | A1* | 5/2011 | Ito | B60R 21/0134 701/45 |
| 2012/0283895 | A1 | 11/2012 | Noda | |

FOREIGN PATENT DOCUMENTS

| | | |
|---|---|---|
| DE | 602004002081 T2 | 3/2007 |
| JP | 2008-308036 | 12/2008 |
| JP | 2008308036 A * | 12/2008 |
| JP | 2010-003002 | 1/2010 |
| JP | 2012-234407 | 11/2012 |

OTHER PUBLICATIONS

Office Action dated Nov. 17, 2015 in corresponding DE Application No. 10 2014 105 696.5 with English translation.

* cited by examiner

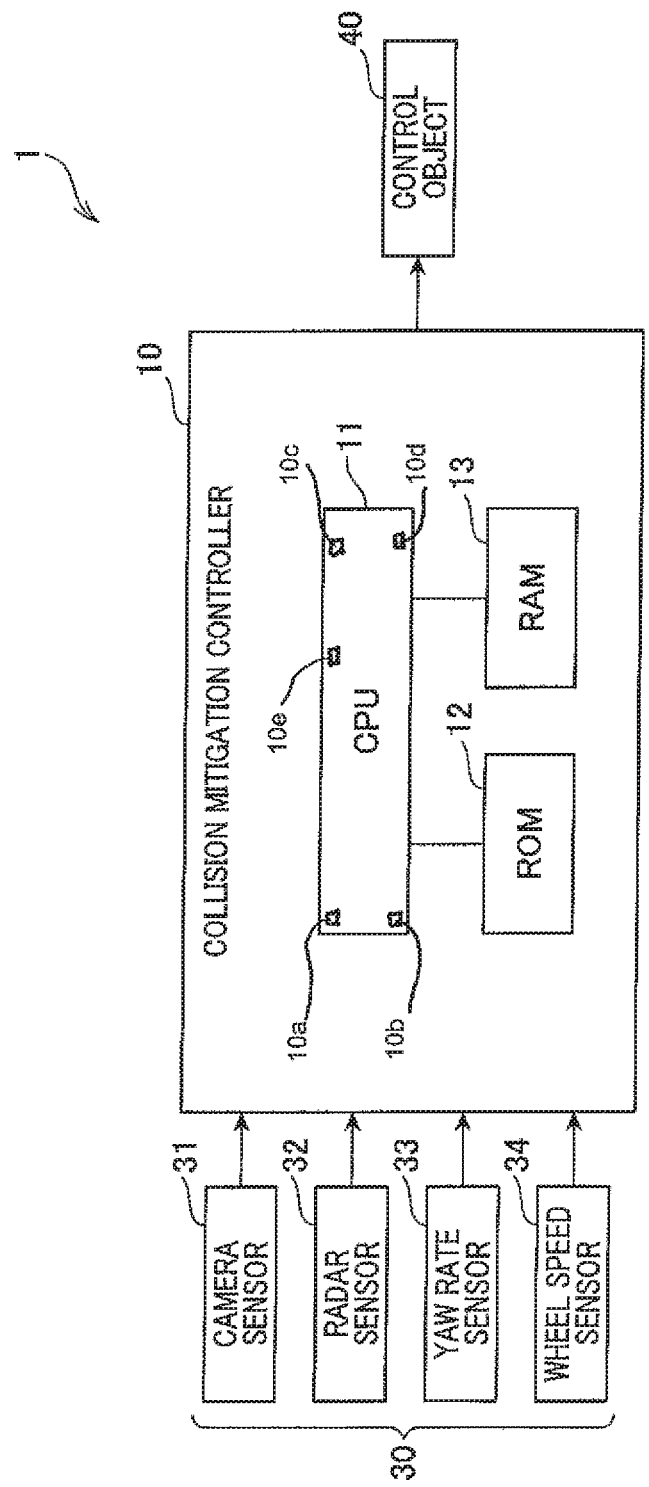

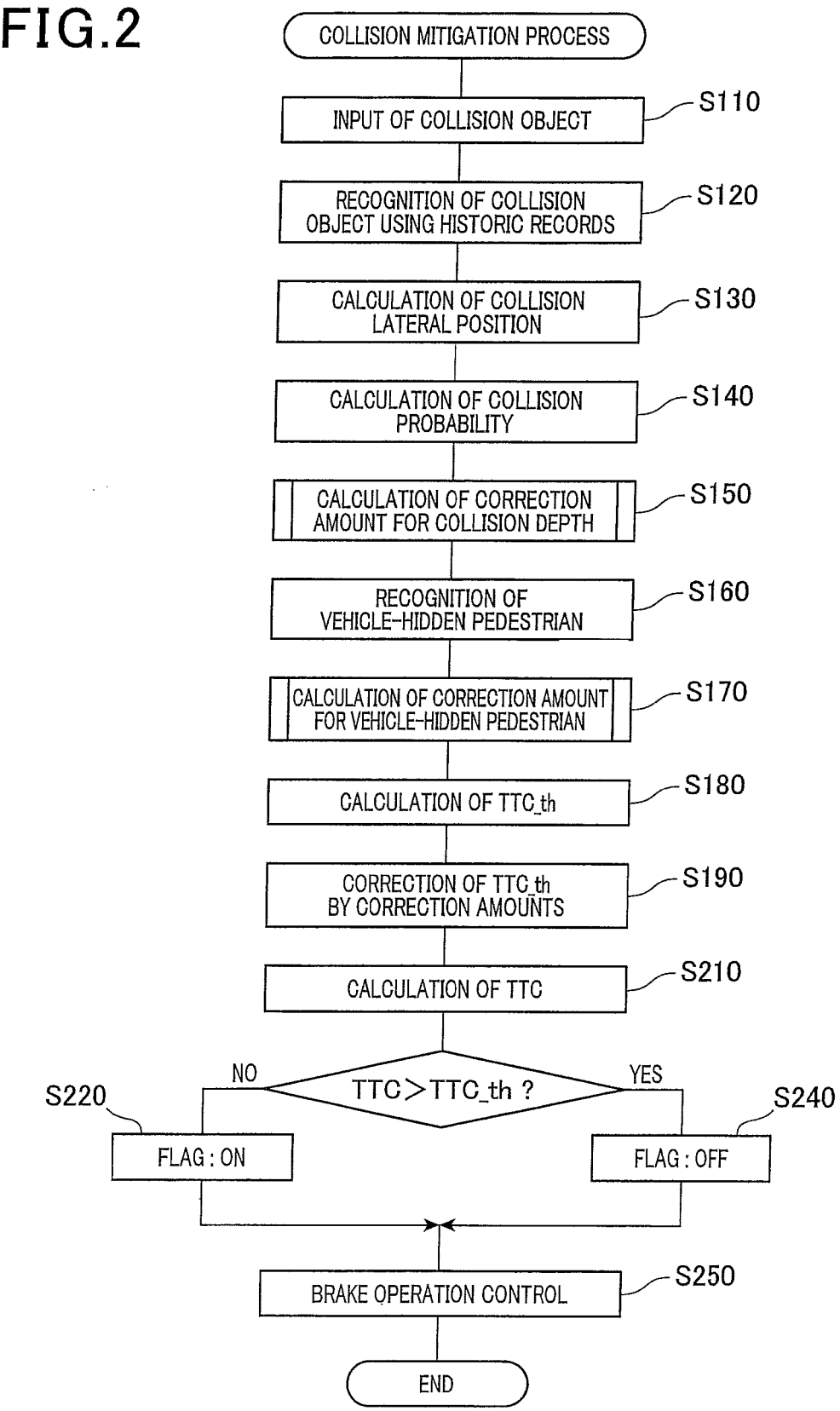

VEHICLE-USE COLLISION MITIGATION APPARATUS

This application claims priority to Japanese Patent Application No. 2013-93822 filed on Apr. 26, 2013, the entire contents of which are hereby incorporated by reference.

BACKGROUND OF THE INVENTION

1. Field of the Invention

The present invention relates to a vehicle-use collision mitigation apparatus for mitigating damage to a vehicle resulting from a collision of the vehicle with an object on a road.

2. Description of Related Art

There is known a vehicle-use collision mitigation apparatus configured to change duration of a braking operation depending on a collision probability. For example, refer to Japanese Patent Application Laid-open No. 2008-308036.

However, this collision mitigation apparatus has a problem in that it cannot deal with a situation where control for collision mitigation has to be started earlier or later, because although duration of a braking operation can be changed, timing to start the control for collision mitigation is fixed.

SUMMARY

According to an exemplary embodiment, there is provided a collision mitigation apparatus for mitigating damage to a vehicle at a time of collision, the collision mitigation apparatus being mounted on the vehicle, including:

an operation control unit that detects a collision object present around the vehicle, makes a comparison between a collision time indicative of a time remaining before collision between the vehicle and the collision object and an operation reference time according to which timing to start control for avoiding collision is set, and causes a collision mitigation device mounted on the vehicle to start operating depending on a result of the comparison;

a collision probability calculating unit that calculates a collision probability between the vehicle and the collision object; and a reference time setting unit that sets the operation reference time depending on the collision probability.

According to the exemplary embodiment, there is provided a collision mitigation apparatus capable of setting timing to start control for avoiding collision appropriately depending on a collision probability.

Other advantages and features of the invention will become apparent from the following description including the drawings and claims.

BRIEF DESCRIPTION OF THE DRAWINGS

In the accompanying drawings:

FIG. 1 is a block diagram schematically showing the structure of a precrash safety system including a collision mitigation controller 10 as a vehicle-use collision mitigation apparatus according to an embodiment of the invention;

FIG. 2 is a flowchart showing steps of a collision mitigation process performed by a CPU of the collision mitigation controller;

PREFERRED EMBODIMENTS OF THE INVENTION

Figure 3A:
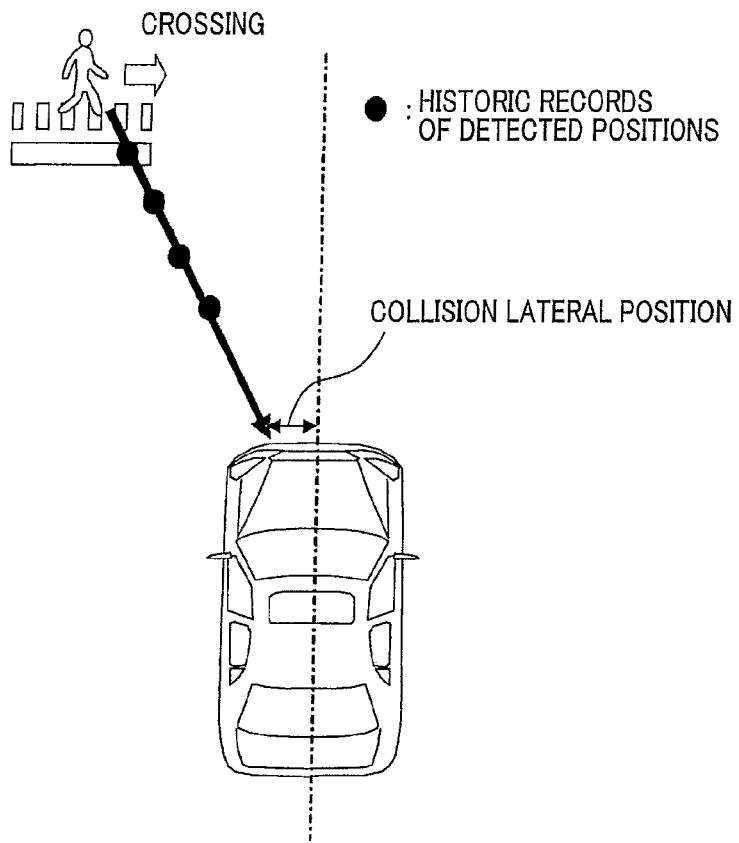
FIGS. 3A, 3B and 3C are bird's-eye views for explaining a collision lateral position and a collision depth.

A precrash safety system 1 (hereinafter PCS 1) including a collision mitigation controller 10 as a vehicle-use collision mitigation apparatus according to an embodiment of the invention is a system mounted on a vehicle (hereinafter the own vehicle) such as a passenger car for determining whether there is a risk of collision, and mitigating possible damage to the vehicle at the time of collision. As shown in FIG. 1, the PCS 1 includes the collision mitigation controller 10, various sensors 30 and a control object 40.

The sensors 30 include a camera sensor 31, a radar sensor 32, a yaw-rate sensor 33 and a wheel speed sensor 34. The camera sensor 31, which is a stereo camera in this embodiment, recognizes the shape of and distance to a collision object such as a pedestrian, an on-road obstacle or a vehicle based on taken images.

The radar sensor 32 detects a collision object while measuring its position relative to the own vehicle. The yaw-rate sensor 33 detects the turning angular velocity of the own vehicle.

The wheel speed sensor 34 detects the wheel rotational speed as the speed of the own vehicle. Detection results of these sensors 30 are received by the collision mitigation controller 10. Incidentally, the camera sensor 31 and the radar sensor 32 perform detection of a collision object present ahead in the moving direction of the own vehicle at a predetermined period (100 ms, for example). The radar sensor 32 emits a directional electromagnetic wave toward a collision object, and receives a reflected version of the directional electromagnetic wave to recognize the shape and size of the collision object.

The collision mitigation controller 10 includes a CPU 11, a ROM 12 and a RAM 13. The CPU 11 of the collision mitigation controller 10 executes programs stored in the ROM 12 in accordance with the detection results received from the sensors 30, to thereby perform various processes including a later-explained collision mitigation process. The CPU 11 and at least one sensor 30 define an operation unit 10a, a collision probability unit 10b, a reference time setting unit 10c, a hidden-state determining unit 10d and a lateral position estimating unit 10e.

The collision mitigation controller 10 drives the control object 40 in accordance with execution results of the processes. The control object or collision mitigation device 40 may be a brake device, a steering device, an actuator for driving a seat belt device, or a warning device. In the following, explanation is given assuming that the control object 40 is the brake device.

In this case, to implement an automatic brake function, the CPU 11 drives the control object 40 in accordance with a detection signal outputted from the wheel speed sensor 34 to achieve a predetermined deceleration rate and a predetermined deceleration amount.

Next, the collision mitigation process performed for automatic breaking is explained with reference to FIGS. 2 to 7. The collision mitigation process is a process initiated at a predetermined period (50 ms, for example).

As shown in FIG. 2, the collision mitigation process begins in step S110 where data about a collision object is received. Here, data indicative of the most recent position of a collision object detected by the camera sensor 31 or the radar sensor 32 is received.

In subsequent step S120, recognition of the collision object is performed. In this embodiment, the type (vehicle, pedestrian, bike, motorbike, and so on) of the collision object detected by the camera sensor 31 is recognized based on the shape of the collision object determined using pattern matching or the like, and this recognized collision object and the collision object previously detected and stored in the RAM 13 are associated with each other. In step S120, the behavior of the collision object and the positional relationship between the collision object and the own vehicle (the coordinates of the collision object relative to the own vehicle) are also recognized.

Next, a collision lateral position of the collision object is calculated by lateral position estimating unit 10e in step S130. Here, the collision lateral position is the distance from the lateral center of the own vehicle to a collision position (a position at which the collision object is expected to collide with the own vehicle). When the collision position is on the left side of the body of the own vehicle, it is given a positive sign. When the collision position is on the right side of the body of the own vehicle, it is given a negative sign. The collision position is estimated at a point at which an extension of the track of the collision object (approximated by a least-squares method, for example) relative to the own vehicle overlaps with the body of the own vehicle.

Figure 4:
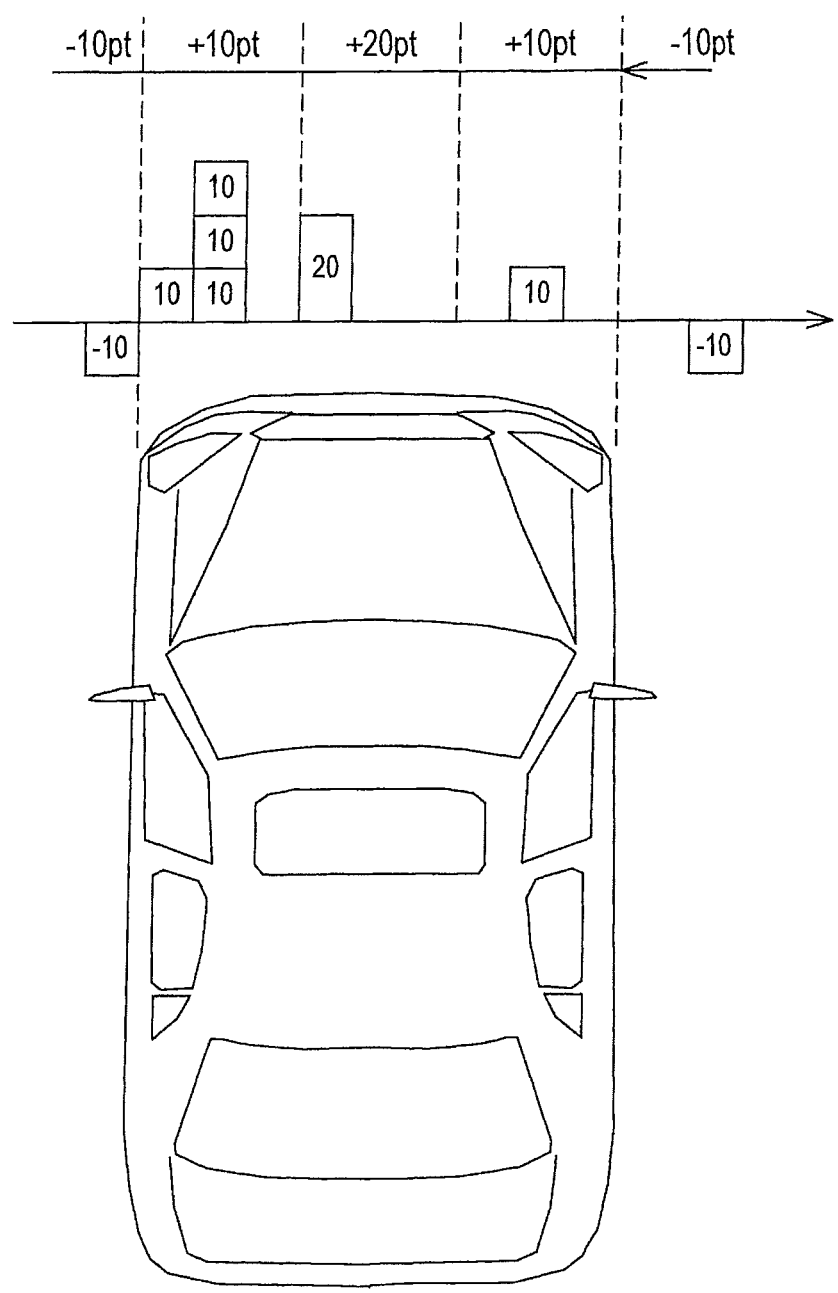
FIG. 4 is a diagram for explaining an example of a method of obtaining a collision probability.
Figure 5:
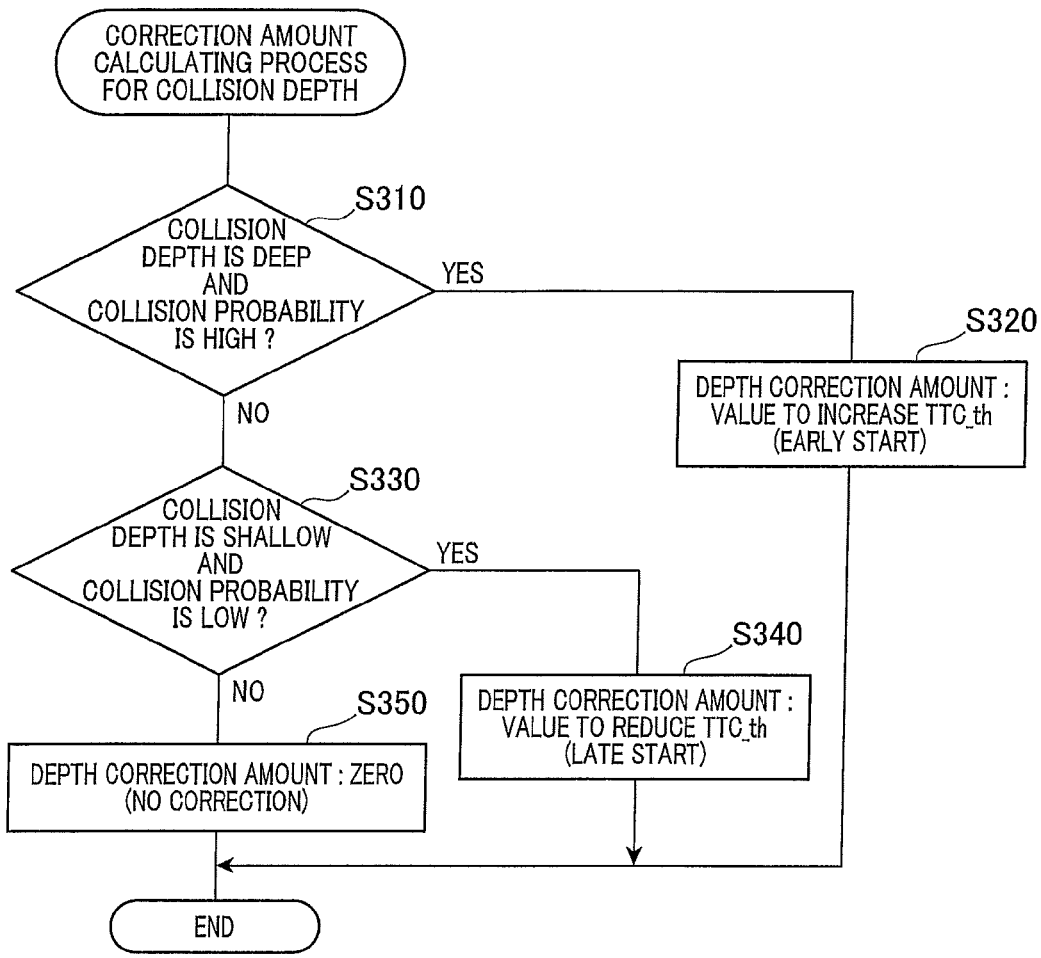
FIG. 5A is a flowchart showing steps of a correction amount calculating process performed by the CPU of the collision mitigation controller in accordance with the collision depth.
FIG. 5B is a diagram showing a relationship among the depth correction amount, the collision lateral position and the collision probability.
Figure 6:
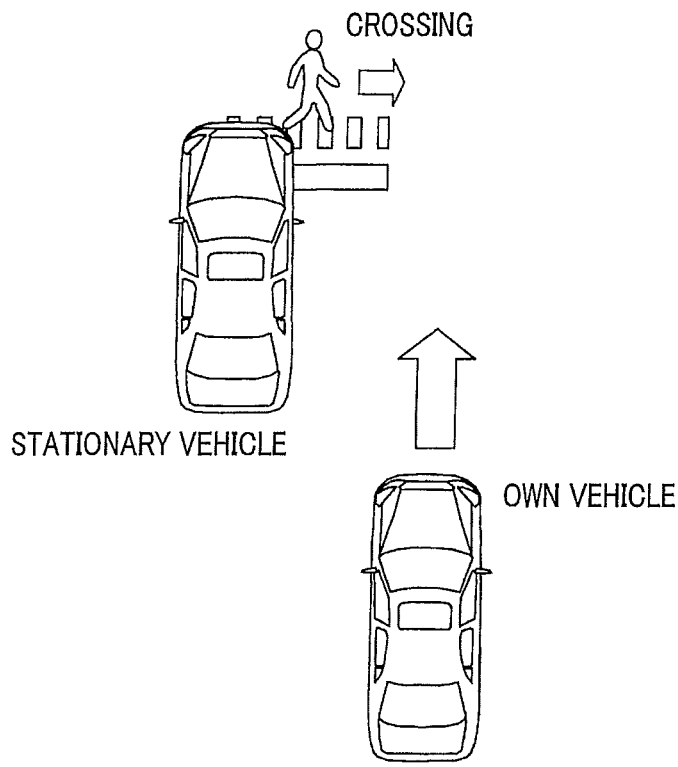
FIG. 6 is a bird's-eye view explaining a vehicle-hidden pedestrian.

After that, a collision probability indicative of the probability of collision between the own vehicle and the collision object is calculated by collision probability unit 10b in step S140. In this embodiment, the collision probability is obtained using a point-integrating method in which points depending on the collision lateral position are added to a score each time the collision mitigation process is performed. In this embodiment, as shown in FIG. 4, the collision position is classified into different areas. The area closer to the lateral center of the own vehicle is assigned higher points.

More specifically, in the example shown in FIG. 4, the collision position is classified into five areas. Of these areas, the one closest to the lateral center is assigned +20 points, the ones laterally adjacent to the area closest to the lateral center are assigned +10 points, and the ones laterally outside the own vehicle are assigned −10 points. In this example, if the collision position is in the area assigned +20 points in the first round of the process, 20 points are added to the score, and by multiplying the score by a predetermined factor (1, for example), the collision probability is calculated to be 20%.

If the collision position is in the area assigned +10 points in the second round of the process, the score is added with 10 points to become 30 points, and accordingly the collision probability is calculated to be 30%. If the collision position is in the area assigned −10 points in the third round of the process, 10 points are subtracted from the score, and accordingly the collision probability is calculated to be 20%

After step S140, step S150 is performed to perform a correction amount calculating process for collision depth. As shown in FIG. 5A, in this correction amount calculating process, a collision depth is compared with a reference depth, and the collision probability is compared with a reference probability.

Figure 3B:
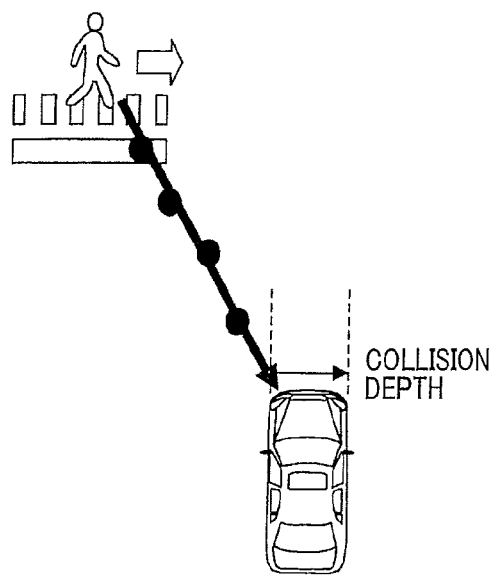
Figure 3C:
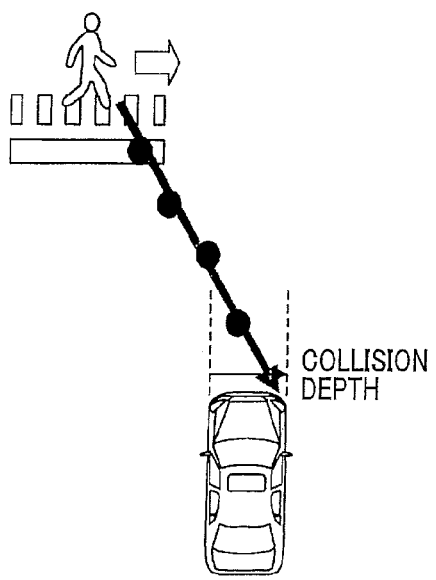

As shown in FIGS. 3B and 3C, the collision depth is the distance between the collision position and the front corner in the lateral direction of the own vehicle on the side closer to a pedestrian as the collision object. In a case where the pedestrian crosses a road from the left side with respect to the own vehicle, the collision depth becomes shallower as the collision position is on the more left side (or closer to the pedestrian) as seen from FIG. 3B, and becomes deeper as the collision position is on the more right side (or more remote from the pedestrian) as seen from FIG. 3C.

The reference depth can be set arbitrarily. For example, it may be the distance between the lateral center and the front corner of the own vehicle. The reference probability can be set arbitrarily. For example, it may be set to 50%.

The correction amount calculating process begins in step S310 where it is determined whether or not the collision depth is deeper than the reference depth and the collision probability is higher than the reference probability. If the determination result in step S310 is affirmative, the process proceeds to step S320 where a depth correction amount is set to such a value that an operation reference time TTC_th is increased by a certain value (0.5 seconds, for example). Thereafter, the correction amount calculating process for collision depth is terminated.

Here, the operation reference time TTC_th is a reference value set by reference time setting unit 10c depending on which the timing to start control for avoiding collision between the own vehicle and the collision object is determined. When the operation reference time TTC_th is smaller, the timing to start the control for avoiding collision is later, and when the operation reference time TTC_th is larger, the timing to start the control for avoiding collision is earlier.

If the determination result in step S310 is negative, the process proceeds to step S330 where is it determined whether or not the collision depth is shallower than the reference depth and the collision probability is lower than the reference probability. If the determination result in step S330 is affirmative, the process proceeds to step S340 where the depth correction amount is set to such a value that the operation reference time TTC_th is reduced by a certain value (−0.5 seconds, for example). Thereafter, the correction amount calculating process for collision depth is terminated.

If the determination result in step S330 is negative, the process proceeds to step S350 where the depth correction amount is set to zero. Thereafter, the correction amount calculating process for collision depth is terminated.

The depth correction amount set by the above explained steps S310 to S350, the collision lateral position and the collision probability are in the relationship shown in FIG. 5B. That is, the operation reference time TTC_th is set smaller to retard the timing to start the control for avoiding collision (late start) when the collision depth is shallower or the collision probability is lower. On the other hand, the operation reference time TTC_th is set larger to advance the timing to start the control for avoiding collision (early start) when the collision depth is deeper or the collision probability is higher.

Returning to FIG. 2, after completion of step S150, step S160 is performed by hidden-state determining unit 10d to recognize a vehicle-hidden pedestrian. Here, the term "a vehicle-hidden pedestrian" is a pedestrian who is at least partially hidden behind a stationary vehicle or the like present in front of the own vehicle, or a pedestrian appearing from a stationary vehicle in front of the own vehicle. That is, "a vehicle-hidden pedestrian" is a pedestrian who is present or appearing beyond a stationary vehicle.

Figure 7:
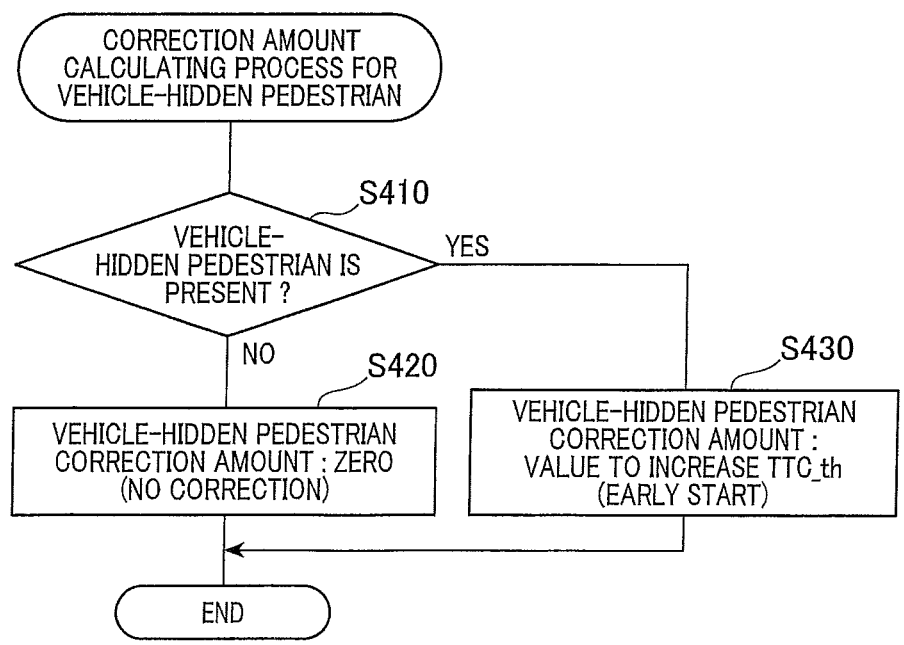
FIG. 7 is a flowchart showing steps of a correction amount calculating process for a vehicle-hidden pedestrian performed by the CPU of the collision mitigation controller.

Subsequently, in step S170, a correction amount calculating process for vehicle-hidden pedestrian is performed. As shown in FIG. 7, this process begins in step S410 where it is determined whether a vehicle-hidden pedestrian is present or not. If the determination result in step S410 is negative, the process proceeds to step S420 where a vehicle-hidden pedestrian correction amount is set to zero, and thereafter the correction amount calculating process for vehicle-hidden pedestrian is terminated. If the determination result in step S410 is affirmative, the process proceeds to step S430 where the vehicle-hidden pedestrian correction amount is set to such a value that the operation reference time TTC_th is increased by a certain time (0.5 seconds, for example). Thereafter, the correction amount calculating process for vehicle-hidden pedestrian is terminated.

Returning FIG. 2, after completion of the correction amount calculating process for vehicle-hidden pedestrian, the operation reference time TTC_th is calculated in step S180. In step S180, the operation reference time TTC_th is calculated such that the vehicle driver can barely avoid collision if the vehicle driver performs a necessary operation immediately.

Subsequently, the calculated operation reference time TTC_th is corrected in step S190. More specifically, the depth correction amount and the vehicle-hidden pedestrian correction amount are added to the operation reference time TTC_th calculated in step S180.

Thereafter, a collision time TTC indicative of the time remaining before collision is calculated based on the behavior and relative speed of the collision object by operation control unit 10a in step S210. Subsequently, it is determined whether or not the collision time TTC is greater than the operation reference time TTC_th in step S220.

If the determination result in step S220 is negative, the process proceeds to step S230 where an automatic braking command to command applying braking to the own vehicle is generated. More specifically, an operation flag is set on in the RAM 13. Subsequently, brake operation control is performed in step S250. In this brake operation control, an operation command is transmitted to the control object 40 (or to each of the control objects 40 if they are plural in number) in response to the operation flag.

If the determination result in step S220 is affirmative, the process proceeds to step S240 where the automatic braking command is prevented from being generated, that is, the operation flag is reset in the RAM 13. Subsequently, the brake control is performed in step S250.

After completion of step S250, the collision mitigation process is terminated. The embodiment of the invention described above provides the following advantages. The collision mitigation controller 10 detects a collision object present around the own vehicle, compares the collision time TTC indicative of the time remaining before collision and the operation reference time TTC_th in accordance which the timing to start the control for avoiding collision is determined, and causes the control object 40 to start operating for mitigating possible damage to the own vehicle. The collision mitigation controller 10 calculates the collision probability between the own vehicle and the detected collision object, and sets the operation reference time TTC_th in accordance with the calculated collision probability.

According to the PCS1 described above, since the operation reference time TTC_th is set in accordance with the collision probability, it is possible to set the timing to start the control for avoiding collision properly depending on variable situation between the own vehicle and a collision object.

The collision mitigation controller 10 of the PCS1 estimates the collision position indicative of a position in the lateral direction of the own vehicle at which the collision object is expected to collide with the own vehicle, and sets the operation reference time TTC_th based on the estimated collision position and the calculated collision probability.

According to the PCS1, since not only the collision probability but also the collision position is taken into account, the timing to start the control for avoiding variation can be set more properly. The collision mitigation controller 10 of the PCS1 estimates the collision depth indicative of the distance between the collision position and the front corner in the lateral direction of the own vehicle on the side closer to the collision object, and sets the operation reference time TTC_th such that it increases with the increase of the collision depth.

Since a pedestrian or the like crossing a road is likely to stop when noticing an approaching vehicle, the collision probability can be estimated to be higher when the collision depth is deeper. Hence, in this embodiment described above, the operation reference time TTC_th is set so as to increase with the increase of the collision depth.

The collision mitigation controller 10 of the PCS1 determines whether a collision object is in a masked state where it is at least partially hidden behind another object, or is appearing from another object, and sets the operation reference time TTC_th to a larger value if the collision objet has been determined to be in a masked state. Accordingly, in a case where a collision object in a masked object appears in front of the own vehicle, since the control object 40 starts operating early, the control for avoiding collision can be effected early. For a case where the collision probability is obtained by using the point-integrating method as is the case with the above described embodiment of the invention, since time delay is inevitably involved in determining the collision probability, such a configuration to determine whether a collision object is in a masked state is particularly advantageous. In addition, using the point-integrating method makes it possible to obtain the collision probability reliably by a simple structure.

Other Embodiments

It is a matter of course that various modifications can be made to the above described embodiment. Part of the components of the above embodiment may be omitted if the object of the invention can be achieved.

In the above embodiment, both the camera 31 and the radar sensor 32 are used for increasing the accuracy of object recognition. However, the above embodiment may be modified to use only one of the camera 31 and the radar sensor 32.

The PCS1 may be configured to detect, as a vehicle-hidden object, a moving object such as a pedestrian or a bicycle which is appearing from not only a stationary vehicle but also a building or a road side tree. In the above embodiment, the point-integrating method is used to obtain the collision probability. However, the collision probability may be derived in accordance with a result of determining whether a pedestrian is going to cross a road, a collision time, a moving speed of an object, a speed of the own vehicle, the relative speed or position of an object.

The collision mitigation controller 10 of the PCS1 is configured to change only the vehicle-hidden pedestrian correction amount when a vehicle-hidden pedestrian is recognized. However, collision mitigation controller 10 of the PCS1 may be configured to also increase the collision probability by a certain value (50%, for example) when a vehicle-hidden pedestrian is recognized, so that the control for collision mitigation is started even earlier.

Correspondence between the above described embodiment and the claims:

The PCS1 corresponds to the collision mitigation apparatus. The control object 40 corresponds to the collision mitigation device. Step S130 corresponds to the lateral position estimating unit. S140 corresponds to the collision probability calculating unit. Step S160 corresponds to the hidden-state determining unit. Steps S180 and S190 correspond to the reference time setting unit. Steps S120 and S220 to S250 correspond to the operation control unit.

The above explained preferred embodiments are exemplary of the invention of the present application which is described solely by the claims appended below. It should be understood that modifications of the preferred embodiments may be made as would occur to one of skill in the art.

What is claimed is:

1. A collision mitigation apparatus for mitigating damage to a vehicle at a time of collision, on which the collision mitigation apparatus is mounted, comprising:
   an operation control unit that detects a collision object present around the vehicle, makes a comparison between a collision time indicative of a time to collision between the vehicle and the collision object and an operation reference time according to which timing to start control for avoiding collision is set, and causes a collision mitigation device mounted on the vehicle to start operating depending on a result of the comparison;
   a collision probability calculating unit that calculates a collision probability between the vehicle and the collision object;
   a reference time setting unit that sets the operation reference time depending on the collision probability; and
   a hidden-state determining unit that determines whether or not the collision object is in a hidden state where the collision object is at least partially hidden behind an object or is appearing from behind an object, wherein
   the reference time setting unit increases the operation reference time if the collision object is determined to be in the hidden state to cause the collision mitigation device to start operating earlier.

2. The collision mitigation apparatus according to claim 1, further comprising a lateral position estimating unit that estimates a collision position in a lateral direction of the vehicle between the collision object and the vehicle,
   the reference time setting unit being configured to set the operation reference time depending on the collision probability and further on the collision position.

3. The collision mitigation apparatus according to claim 2, wherein the lateral position estimating unit estimates, as the collision position, a collision depth indicative of a distance between a corner closer to the collision object of the vehicle and the collision position,
   the reference time setting unit being configured to increase the operation reference time with increase of the collision depth.

4. A collision mitigation apparatus for mitigating damage to a vehicle at a time of collision, on which the collision mitigation apparatus is mounted, comprising:
   an operation control unit that detects a collision object present around the vehicle, makes a comparison between a collision time indicative of a time to collision between the vehicle and the collision object and an operation reference time according to which timing to start control for avoiding collision is set, and causes a collision mitigation device mounted on the vehicle to start operating depending on a result of the comparison;
   a collision probability calculating unit that calculates a collision probability between the vehicle and the collision object;
   a reference time setting unit that sets the operation reference time depending on the collision probability; and
   a lateral position estimating unit that estimates a collision position in a lateral direction of the vehicle between the collision object and the vehicle, wherein
   the lateral position estimating unit estimates, as the collision position, a collision depth indicative of a distance between a corner closer to the collision object of the vehicle and the collision position, and
   the reference time setting unit increases the operation reference time with increase of the collision depth to cause the collision mitigation device to start operating earlier.

5. A collision mitigation apparatus for mitigating damage to a vehicle at a time of collision, on which the collision mitigation apparatus is mounted, comprising:
   a sensor that recognizes a shape of and a distance to a collision object;
   an operation control unit that detects the collision object present around the vehicle, makes a comparison between a collision time indicative of a time to collision between the vehicle and the collision object and an operation reference time according to which timing to start control for avoiding collision is set, and causes a collision mitigation device mounted on the vehicle to start operating depending on a result of the comparison;
   a collision probability calculating unit that calculates a collision probability between the vehicle and the collision object;
   a reference time setting unit that sets the operation reference time depending on the collision probability; and
   a hidden-state determining unit that determines whether or not the collision object is in a hidden state where the collision object is at least partially hidden behind an object or is appearing from behind an object based on output from the sensor, wherein
   the reference time setting unit increases the operation reference time if the collision object is determined to be in then hidden state to cause the collision mitigation device to start operating earlier.

* * * * *